(12) United States Patent
Watanabe

(10) Patent No.: US 8,676,059 B2
(45) Date of Patent: Mar. 18, 2014

(54) OPTICAL SIGNAL PROCESSING APPARATUS AND OPTICAL COMMUNICATION SYSTEM

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 97 days.

(21) Appl. No.: 13/446,149

(22) Filed: Apr. 13, 2012

(65) Prior Publication Data
US 2012/0301148 A1 Nov. 29, 2012

(30) Foreign Application Priority Data

May 26, 2011 (JP) .................................. 2011-118232

(51) Int. Cl.
| | | |
|---|---|---|
| H04B 10/00 | (2013.01) | |
| H04J 14/02 | (2006.01) | |
| G02F 1/01 | (2006.01) | |
| G02B 6/00 | (2006.01) | |
| G02F 1/35 | (2006.01) | |

(52) U.S. Cl.
USPC ................. 398/180; 398/97; 385/1; 385/122; 359/330

(58) Field of Classification Search
USPC ......... 398/67, 72, 107, 79, 93, 137, 162, 195, 398/206, 209, 213, 12, 19, 45, 51, 54, 111, 398/97, 182, 202, 173–181; 385/1, 5, 122; 359/330
See application file for complete search history.

(56) References Cited

U.S. PATENT DOCUMENTS

| | | | | |
|---|---|---|---|---|
| 5,274,495 A | * | 12/1993 | Shirasaki | 359/330 |
| 5,452,124 A | * | 9/1995 | Baker | 359/341.2 |
| 5,515,192 A | * | 5/1996 | Watanabe | 398/198 |
| 5,596,667 A | | 1/1997 | Watanabe | |
| 5,798,853 A | * | 8/1998 | Watanabe | 398/150 |
| 6,304,348 B1 | * | 10/2001 | Watanabe | 398/9 |
| 6,448,913 B1 | * | 9/2002 | Prucnal et al. | 341/137 |
| 6,486,989 B2 | * | 11/2002 | Shinoda | 398/79 |
| 6,522,818 B1 | * | 2/2003 | Aso et al. | 385/122 |
| 6,665,115 B2 | | 12/2003 | Popov et al. | |
| 7,397,975 B2 | * | 7/2008 | Okabe et al. | 385/11 |
| 7,450,298 B2 | * | 11/2008 | Watanabe | 359/333 |
| 7,639,945 B2 | * | 12/2009 | Tamura et al. | 398/45 |
| 7,853,145 B2 | * | 12/2010 | Futami et al. | 398/25 |
| 8,311,410 B2 | * | 11/2012 | Watanabe | 398/45 |
| 8,385,741 B2 | * | 2/2013 | Okabe et al. | 398/65 |
| 8,488,978 B2 | * | 7/2013 | Watanabe | 398/183 |
| 2002/0171913 A1 | * | 11/2002 | Batchko et al. | 359/333 |
| 2002/0176152 A1 | | 11/2002 | Parolari et al. | |
| 2002/0186457 A1 | * | 12/2002 | Cao | 359/341.2 |
| 2006/0045445 A1 | * | 3/2006 | Watanabe | 385/122 |
| 2008/0165365 A1 | * | 7/2008 | Watanabe | 356/484 |
| 2012/0020665 A1 | * | 1/2012 | Watanabe | 398/65 |

FOREIGN PATENT DOCUMENTS

| | | |
|---|---|---|
| JP | B-3436310 | 8/2003 |
| JP | 2011-215603 | 10/2011 |
| WO | WO-2011/052075 | 5/2011 |

OTHER PUBLICATIONS

Extended European Search Report mailed Aug. 6, 2012 and corresponding to European Patent Application No. 12164735.8.

* cited by examiner

*Primary Examiner* — Ken Vanderpuye
*Assistant Examiner* — Dibson Sanchez
(74) *Attorney, Agent, or Firm* — Fujitsu Patent Center

(57) ABSTRACT

In an optical signal processing apparatus, carrier light propagates through a nonlinear optical medium. An optical combiner optically combines output control light for generating idler light of the carrier light with the carrier light. An optical splitter splits the idler light from the carrier light. A receiver acquires a signal multiplexed on the carrier light from the idler light split by the optical splitter.

5 Claims, 12 Drawing Sheets

US 8,676,059 B2

OPTICAL SIGNAL PROCESSING APPARATUS AND OPTICAL COMMUNICATION SYSTEM

CROSS-REFERENCE TO RELATED APPLICATION

This application is based upon and claims the benefit of priority of the prior Japanese Patent Application No. 2011-118232, filed on May 26, 2011, the entire contents of which are incorporated herein by reference.

FIELD

The embodiment discussed herein is related to an optical signal processing apparatus and optical communication system which propagate carrier light.

BACKGROUND

Optical networks in the future need, for example, to be formed over a conventional optical communication system, and to perform processing for branching, inserting, and switching control light of devices at a point separate from terminal devices such as optical repeater nodes. At this time, from the viewpoint of the efficient energy use, it is effective to minimize the number of conversions between optical signals and electric signals during propagation and processing of information.

In the currently used optical repeater nodes, signals are processed by using conversions between optical signals and electric signals as in the terminal devices. For example, control light transmitted to an optical repeater node is once converted into an electric signal, then electrically processed, and converted into an optical signal again. Therefore, the equipment structure is complicated, and great electric power is needed for compensating for loss caused by the conversions between optical signals and electric signals.

Meanwhile, for example, an optical network may monitor a variety of information in places thereof and transmit a monitor signal to other places thereof. For example, an optical signal processing device provided on a certain place of the optical network multiplexes a monitor signal of the place on which its own device is provided on carrier light propagating through an optical transmission line, and transmits the monitor signal to optical signal processing devices in other places.

In addition, conventionally, a repeater station which uses phase-conjugate light, is arranged between a transmitter station and a receiver station, and is laid through an optical transmission line is disclosed (for example, in Japanese Registered Patent No. 3436310). The repeater station includes a phase-conjugate-light generating device and a modulation unit. The phase-conjugate-light generating device has a control-light/pump-light supply unit and a control-light/phase-conjugate-light extraction unit. The control-light/pump-light supply unit supplies to a nonlinear optical medium pump light and input control light which is transmitted from the transmitter station, and the control-light/phase-conjugate-light extraction unit extracts output control light and phase-conjugate light which are generated by the input control light and pump light supplied to the nonlinear optical medium. The modulation unit modulates the pump light with monitor data unique to the repeater station. The repeater station transmits the phase-conjugate light to the receiver station, where the phase-conjugate light contains the modulated monitor data.

However, there is a problem that when carrier light on which signals are multiplexed is branched from an optical transmission line to receive the signals, an influence such as power loss is exerted on the carrier light propagating through the optical transmission line.

SUMMARY

According to an aspect of the embodiments, an optical signal processing apparatus includes a nonlinear optical medium through which carrier light propagates; an optical combiner configured to optically combine control light for generating idler light of the carrier light with the carrier light; an optical splitter configured to split the idler light from the carrier light; and a receiver configured to receive a signal multiplexed on the carrier light from the idler light split by the optical splitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
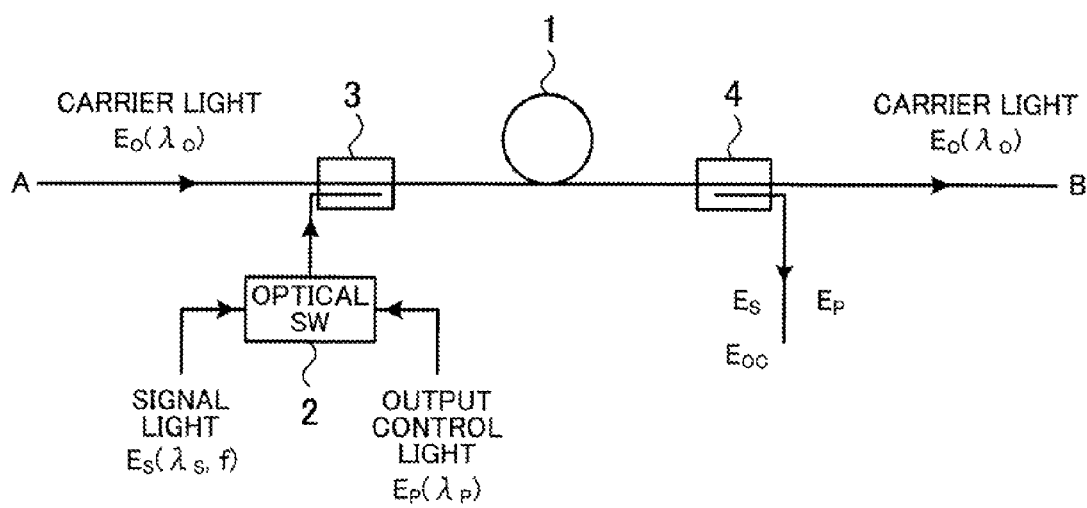
FIG. 1 illustrates an optical signal processing apparatus according to a first embodiment.

Preferred embodiments of the present invention will now be described in detail below with reference to the accompanying drawings, wherein like reference numerals refer to like elements throughout.

First Embodiment

FIG. 1 illustrates an optical signal processing apparatus according to a first embodiment. As illustrated in FIG. 1, the optical signal processing apparatus includes a nonlinear optical medium 1, an optical SW (switch) 2, an optical combiner 3, and an optical splitter 4.

Through the nonlinear optical medium 1, carrier light $E_O$ having a wavelength $\lambda_O$ propagates. The nonlinear optical medium 1 may be a part of an optical fiber which forms an optical transmission line of an optical network. The nonlinear optical medium 1 may further be a nonlinear optical fiber in which a nonlinear optical effect is improved.

On the carrier light $E_O$, data signals are multiplexed. The data signals are multiplexed on the carrier light $E_O$, for example, by the optical signal processing apparatus (not illustrated) provided on the upstream side (A side of FIG. 1) of the optical signal processing apparatus illustrated in FIG. 1. The data signals are multiplexed on the carrier light $E_O$ by the same method as the after-mentioned method. Examples of the data signal include a monitor signal such as a temperature and an image in a place of the optical signal processing apparatus provided on the upstream side and an information signal transmitted from that place.

To the optical switch 2, signal light $E_S$ having a wavelength $\lambda_S$ and output control light $E_P$ having a wavelength $\lambda_P$ are supplied. The wavelengths $\lambda_O$ and $\lambda_S$, $\lambda_P$ are different. The optical SW 2 supplies the signal light $E_S$ to the optical combiner 3, for example, in the case where a data signal is transmitted to the optical signal processing apparatus (not illustrated) provided on the downstream side (B side of FIG. 1). Examples of the data signal transmitted to the optical signal processing apparatus (not illustrated) on the downstream side include a monitor signal such as a temperature and an image in a place of the optical signal processing apparatus illustrated in FIG. 1 and an information signal transmitted from that place. The signal light $E_S$ will be described later, and is optical subcarrier modulated signal in which a carrier signal having a frequency f is modulated by the data signal.

The optical SW 2 supplies the output control light $E_P$ to the optical combiner 3, for example, in the case where the data signal multiplexed on the carrier light $E_O$ by the optical signal processing apparatus (not illustrated) on the upstream side is received by the optical signal processing apparatus of FIG. 1.

To the optical combiner 3, one of the signal light $E_S$ and the output control light $E_P$ output from the optical SW 2 is supplied. The optical combiner 3 optically combines one of the signal light $E_S$ and the output control light $E_P$ produced from the optical SW 2 with the carrier light $E_O$ supplied to the nonlinear optical medium 1. Examples of the optical combiner 3 include a WDM (Wavelength Division Multiplexing) coupler.

In the case where the optical SW 2 supplies the signal light $E_S$ to the optical combiner 3, the signal light $E_S$ is optically combined with the carrier light $E_O$ by the optical combiner 3 and both lights are supplied to the nonlinear optical medium 1. Through a cross-phase modulation (XPM) in the nonlinear optical medium 1, the carrier light $E_O$ undergoes phase modulation proportional to power of the signal light $E_S$, and as a result the data signal is frequency-division multiplexed. The multiplexed data signal is received, for example, by the optical signal processing apparatus (not illustrated) or the optical receiver on the downstream side.

In the case where the optical SW 2 supplies the output control light $E_P$ to the optical combiner 3, the carrier light $E_O$ and the output control light $E_P$ is optically combined by the optical combiner 3, and both lights are supplied to the nonlinear optical medium 1. Idler light $E_{OC}$ (four-wave mixing light in the case where the nonlinear optical medium 1 is an optical fiber) having a wavelength $\lambda_{OC}$ is generated by four-wave mixing (FWM) in the nonlinear optical medium 1 using the output control light $E_P$ as a pump light.

Figure 2A:
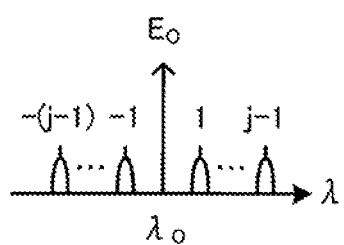
FIGS. 2A and 2B illustrate spectra of carrier light propagating through an optical network of FIG. 1.
Figure 2B:
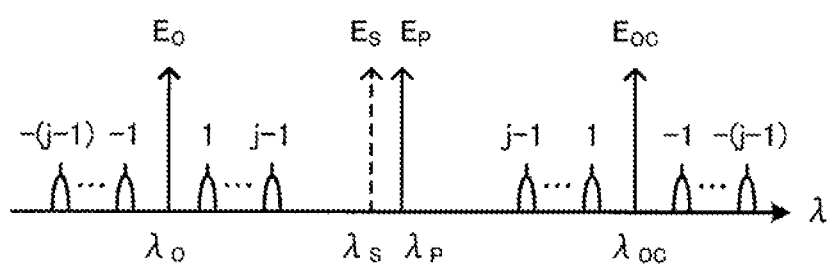

FIGS. 2A and 2B illustrate spectra of the carrier light propagating through the optical network of FIG. 1. FIG. 2A illustrates spectra of the carrier light $E_O$ supplied to the optical combiner 3 of FIG. 1. FIG. 2B illustrates spectra of the carrier light $E_O$, the output control light $E_P$, and the idler light $E_{OC}$ supplied to the nonlinear optical medium 1.

As illustrated in FIG. 2A, (j−1) data signals are supposed to be multiplexed on the carrier light $E_O$, for example, by the optical signal processing apparatus (not illustrated in FIG. 1) on the upstream side. When the output control light $E_P$ having the wavelength $\lambda_P$ is optically combined with this carrier light $E_O$ and then the combined carrier light $E_O$ and control light $E_P$ supplied to the nonlinear optical medium 1, the carrier light $E_O$, control light $E_P$, and idler light $E_{OC}$ of the spectra illustrated in FIG. 2B is produced from the nonlinear optical medium 1.

The spectra of the idler light $E_{OC}$ are obtained with the symmetric spectra of the carrier light $E_O$ with respect to the center of the wavelength $\lambda_P$, as illustrated in FIG. 2B. Specifically, when the output control light $E_P$ is supplied to the nonlinear optical medium 1, a copy of the carrier light $E_O$ is obtained as the idler light $E_{OC}$.

As a result, without branching the carrier light $E_O$ from the optical transmission line, if branching the idler light $E_{OC}$ by the optical splitter 4, the optical signal processing apparatus illustrated in FIG. 1 acquires, for example, the data signal multiplexed by the optical signal processing apparatus (not illustrated) on the upstream side. Specifically, the optical signal processing apparatus illustrated in FIG. 1 suppresses an influence exerted on the carrier light $E_O$ propagating through the optical transmission line, thus acquiring the data signals.

Returning to the description of FIG. 1, in the case where the optical SW 2 supplies the signal light $E_S$ to the optical combiner 3, the signal light $E_S$ is optically combined with the carrier light $E_O$, and the carrier light $E_O$ is supplied to the nonlinear optical medium 1. The optical splitter 4 splits the signal light $E_S$ from the carrier light $E_O$ so as not to allow the signal light $E_S$ to propagate through the latter optical transmission line. In the case where the optical SW 2 further supplies the output control light $E_P$ to the optical combiner 3, the output control light $E_P$ is optically combined with the carrier light $E_O$. The optical splitter 4 splits the output control light $E_P$ from the carrier light $E_O$ so as not to allow the output control light $E_P$ to propagate through the latter optical transmission line. In the case where the optical SW 2 further supplies the output control light $E_P$ to the optical combiner 3, the idler light $E_{OC}$ is generated in the nonlinear optical medium 1. The optical splitter 4 splits the idler light $E_{OC}$ from the carrier light $E_O$ so as not to allow the idler light $E_{OC}$ to propagate through the latter optical transmission line. In other words, the optical splitter 4 allows the carrier light $E_O$ to propagate through the optical transmission line of the optical network.

The idler light $E_{OC}$ split by the optical splitter 4 is converted to electric signals by a PD (Photo Diode) of a receiver, for example, and demodulated to the data signals. Examples of the optical splitter 4 include a WDM coupler.

Figure 3:
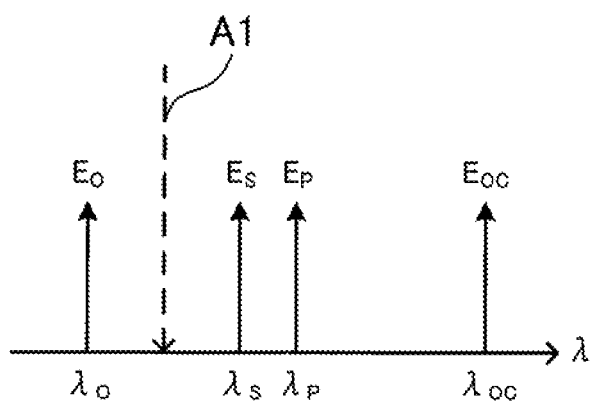
FIG. 3 illustrates a wavelength characteristic of an optical combiner and an optical splitter.

FIG. 3 illustrates a wavelength characteristic of the optical combiner and the optical splitter. The horizontal axis of FIG. 3 represents the wavelength and the vertical direction represents the power. In FIG. 3, wavelength allocation of the carrier light $E_O$ having the wavelength $\lambda_O$, the signal light $E_S$ having the wavelength $\lambda_S$, the output control light $E_P$ having the wavelength $\lambda_P$, and the idler light $E_{OC}$ having the wavelength $\lambda_{OC}$ illustrated in FIG. 1 is illustrated.

A dotted arrow A1 illustrated in FIG. 3 indicates a cut-off wavelength of the optical combiner 3 and the optical splitter 4. With respect to an input port of the carrier light $E_O$, for example, the optical combiner and the optical splitter 4 pass light having a wavelength smaller than the cut-off wavelength indicated in the dotted arrow A1 and cut-off (split) light having a wavelength equal to or longer than the cut-off wavelength indicated in the dotted arrow A1.

Specifically, a cut-off wavelength of the carrier light $E_O$ of the optical combiner 3 and the optical splitter 4 illustrated in FIG. 1 with respect to the input port is set as indicated in the dotted arrow A1. Further, the wavelength $\lambda_O$ of the carrier light $E_O$, the wavelength $\lambda_S$ of the signal light $E_S$, and the wavelength $\lambda_P$ of the output control light $E_P$ are arranged as illustrated in FIG. 3. As a result, the carrier light $E_O$ undergoes cross phase modulation with the signal light $E_S$, and generates four-wave mixing light due to the output control light $E_P$ without loss. Through the optical transmission line of the optical network, the carrier light $E_O$ propagates, and the signal light $E_S$ and the output control light $E_P$ fails to propagate.

Operations of FIG. 1 will be described. First, the case where the data signal is multiplexed on the carrier light $E_O$ will be described. The optical SW 2 supplies the signal light $E_S$ to the optical combiner 3, for example, according to a monitor request from the optical signal processing apparatus (not illustrated) on the downstream side. The signal light $E_S$ supplied to the optical combiner 3 is optically combined with the carrier light $E_O$, and the carrier light $E_O$ is supplied to the nonlinear optical medium 1. In the nonlinear optical medium 1, the carrier light $E_O$ undergoes cross phase modulation with the signal light $E_S$, and the subcarrier-multiplexed data signal of the signal light $E_S$ is frequency-division multiplexed on the carrier light $E_O$. Through the above process, the data signal in a place of the optical signal processing apparatus of FIG. 1 is transmitted to the downstream side.

As described above, for example, the signal light $E_S$ is light in which a carrier signal having a subcarrier frequency f is optical subcarrier modulated signal modulated by the data signal. Accordingly, for example, when changing a frequency of the subcarrier modulated signal of each optical signal processing apparatus provided on the optical transmission line of the optical network, the data signal is frequency-division multiplexed on the carrier light $E_O$.

Next, the case where the data signal multiplexed on the carrier light $E_O$ is acquired by the optical signal processing apparatus of FIG. 1 will be described. In other words, the case where monitor data in a place on the upstream side is acquired by the optical signal processing apparatus of FIG. 1 will be described.

In this case, the optical SW 2 supplies to the optical combiner 3 the output control light $E_P$ having the wavelength $\lambda_P$ different from the wavelength $\lambda_O$ of the carrier light $E_O$. The output control light $E_P$ supplied to the optical combiner 3 is optically combined with the carrier light $E_O$, and the carrier light $E_O$ is supplied to the nonlinear optical medium 1. In the nonlinear optical medium 1, the idler light $E_{OC}$ is generated using the output control light $E_P$ as pump light.

The optical splitter 4 splits the idler light $E_{OC}$ from the carrier light $E_O$. Because the idler light $E_{OC}$ is a copy of the carrier light $E_O$ as illustrated in FIG. 2, it contains the same information of the carrier light $E_O$. Accordingly, the optical signal processing apparatus does not split the carrier light $E_O$ but split the idler light $E_{OC}$ from the optical transmission line, and acquires the data signal from the split idler light $E_{OC}$. Specifically, the optical signal processing apparatus makes it possible to acquire the data signal multiplexed on the carrier light $E_O$ so as not to exert an influence such as power loss on the carrier light $E_O$ propagating through the optical transmission line.

As can be seen from the above discussion, in order to acquire the data signal multiplexed on the carrier light $E_O$ from the idler light $E_{OC}$ of the carrier light $E_O$, the optical signal processing apparatus optically combines the output control light $E_P$ for generating the idler light $E_{OC}$ with the carrier light $E_O$. These features of the present embodiment permit the optical signal processing apparatus to suppress an influence exerted on the carrier light $E_O$ and acquire the data signal multiplexed on the carrier light $E_O$.

Further, the carrier light $E_O$ propagates through the optical transmission line without causing loss due to the branching, and is linearly amplified by optical parametric amplification in the case where the power of the output control light $E_P$ is sufficiently large. Accordingly, these features of the present embodiment permit the optical signal processing apparatus to acquire the data signal without almost reducing an optical signal-to-noise ratio of the carrier light $E_O$.

In addition, in FIG. 1, the optical SW 2 switches between the signal light $E_S$ and the output control light $E_P$ to supply one of the signal light $E_S$ and the output control light $E_P$ to the optical combiner 3. However, in the case where only the data signal is received from the idler light $E_{OC}$ split by the optical splitter 4, the output control light $E_P$ may be supplied to the optical combiner 3 without providing the optical SW 2.

Second Embodiment

Next, a second embodiment will be described in detail with reference to the accompanying drawings. In the first embodiment, the case where the carrier light propagates through the optical transmission line in one direction is described. In the second embodiment, the case where the carrier light propagates through the optical transmission line in two directions will be described.

Figure 4:
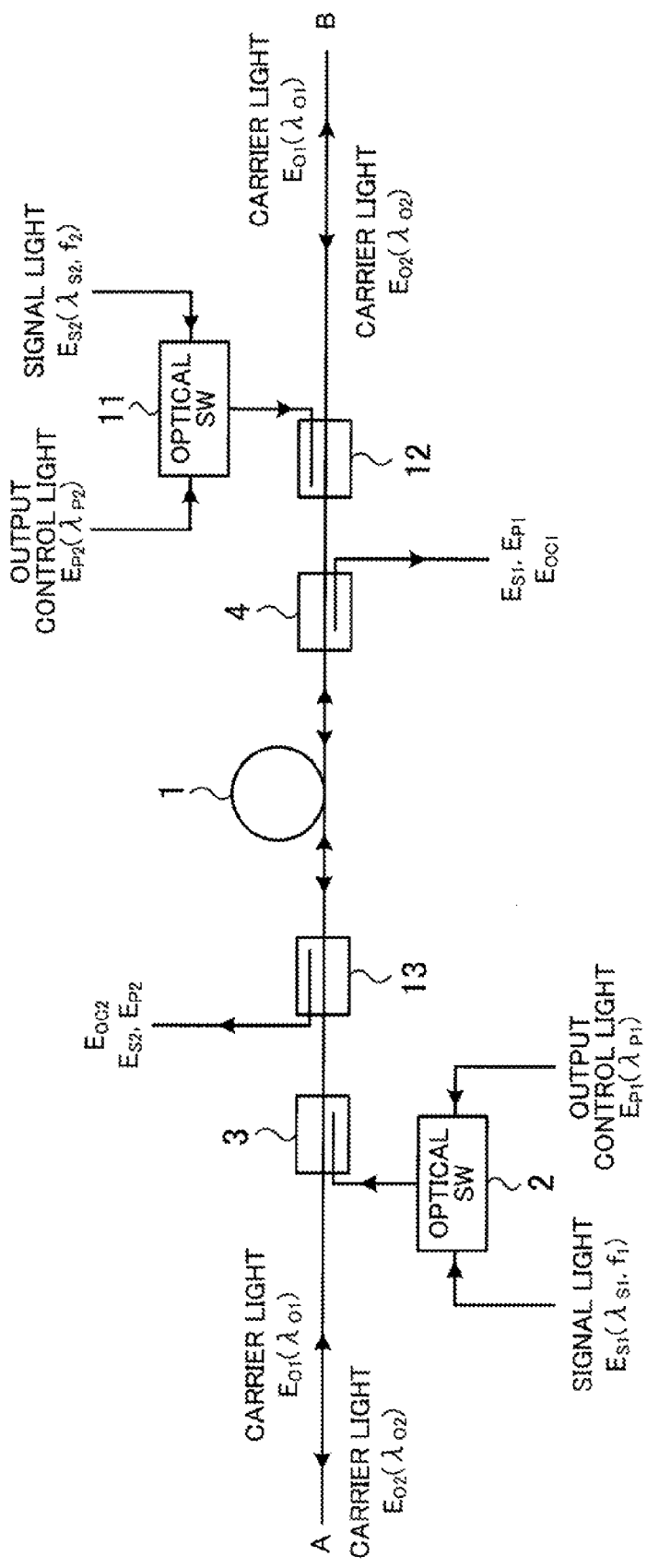
FIG. 4 illustrates an optical signal processing apparatus according to a second embodiment.

FIG. 4 illustrates an optical signal processing apparatus according to the second embodiment. As illustrated in FIG. 4, the optical signal processing apparatus includes the nonlinear optical medium 1, the optical SWs 2 and 11, the optical combiners 3 and 12, and the optical splitters 4 and 13. In FIG. 4, the same circuit elements as those of FIG. 1 are indicated by the same reference numerals as in FIG. 1.

Through an optical transmission line of an optical network illustrated in FIG. 4, carrier light $E_{O1}$ having a wavelength $\lambda_{O1}$ propagates from an A direction to a B direction. Through the optical transmission line of the optical network, carrier light $E_{O2}$ having a wavelength $\lambda_{O2}$ further propagates from the B direction to the A direction opposite to a propagation direction of the carrier light $E_{O1}$.

To the optical SW 2, signal light $E_{S1}$ having a wavelength $\lambda_{S1}$ and output control light $E_{P1}$ having a wavelength $\lambda_{P1}$ are supplied. The signal light $E_{S1}$ is optically modulated by a subcarrier modulated signal in which a subcarrier signal having a frequency $f_1$ is modulated by a data signal.

To the optical SW 11, signal light $E_{S2}$ having a wavelength $\lambda_{S2}$ and output control light $E_{P2}$ having a wavelength $\lambda_{P2}$ are supplied. The signal light $E_{S2}$ is optically modulated by a subcarrier modulated signal in which a subcarrier signal having a frequency $f_2$ is modulated by a data signal.

The optical splitter 4 splits the signal light $E_{S1}$, the output control light $E_{P1}$, and idler light $E_{OC1}$ from the carrier light $E_{O1}$. The idler light $E_{OC1}$ is idler light of the carrier light $E_{O1}$ generated by FWM using the output control light $E_{P1}$ as pump light.

The optical splitter 13 splits the signal light $E_{S2}$, the output control light $E_{P2}$, and idler light $E_{OC2}$ from the carrier light $E_{O2}$. The idler light $E_{OC2}$ is idler light of the carrier light $E_{O2}$ generated by FWM using the output control light $E_{P2}$ as pump light.

The nonlinear optical medium 1, optical SW 2, optical combiner 3, and optical splitter 4 illustrated in FIG. 4 are the same as the nonlinear optical medium 1, optical SW 2, optical combiner 3, and optical splitter 4 illustrated in FIG. 1. Specifically, in the nonlinear optical medium 1, optical SW 2, optical combiner 3, and optical splitter 4 illustrated in FIG. 4, data signals are multiplexed on the carrier light $E_{O1}$ propagating from the A direction to the B direction. Further, the data signals multiplexed on the carrier light $E_{O1}$ are acquired on the upstream side (A side of FIG. 4).

Also, the nonlinear optical medium 1, the optical SW 11, the optical combiner 12, and the optical splitter 13 are the same as the nonlinear optical medium 1, optical SW 2, optical combiner 3, and optical splitter 4 illustrated in FIG. 1. Note that in the nonlinear optical medium 1, optical SW 11, optical combiner 12, and optical splitter 13 illustrated in FIG. 4, data signals are multiplexed on the carrier light $E_{O2}$ propagating in a direction opposite to that of the carrier light $E_{O1}$. Further, the data signals multiplexed on the carrier light $E_{O2}$ are acquired on the downstream side (B side of FIG. 4). That is, the nonlinear optical medium 1, the optical SW 11, the optical combiner 12, and the optical splitter 13 perform operations opposite to those of the nonlinear optical medium 1, the optical SW 2, the optical combiner 3, and the optical splitter 4 so as to transmit data signals to the upstream direction and acquire (receive) the data signals transmitted from the downstream direction.

Figure 5:
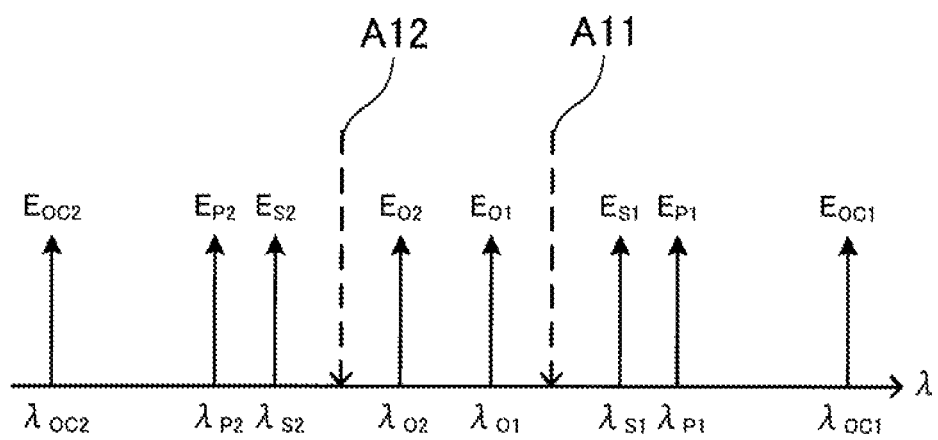
FIG. 5 illustrates a wavelength characteristic of an optical combiner and an optical splitter.

FIG. 5 illustrates a wavelength characteristic of the optical combiner and the optical splitter. The horizontal axis of FIG. 5 represents the wavelength and the vertical direction represents the power. In FIG. 5, wavelength allocation of the carrier light $E_{O1}$ and $E_{O2}$ having the wavelengths $\lambda_{O1}$ and $\lambda_{O2}$, the signal light $E_{S1}$ and $E_{S2}$ having the wavelengths $\lambda_{S1}$ and $\lambda_{S2}$, the output control light $E_{P1}$ and $E_{P2}$ having the wavelengths $\lambda_{P1}$ and $\lambda_{P2}$, and the idler light $E_{OC1}$ and $E_{OC2}$ having the wavelengths $\lambda_{OC1}$ and $\lambda_{OC2}$ illustrated in FIG. 4 is illustrated.

A dotted arrow A11 illustrated in FIG. 5 indicates a cut-off wavelength of the optical combiner 3 and the optical splitter 4. With respect to an input port of the carrier light $E_{O1}$, for example, the optical combiner and the optical splitter 4 pass light having a wavelength smaller than the cut-off wavelength indicated in the dotted arrow A11 and cut-off (split) light having a wavelength equal to or greater than the cut-off wavelength indicated in the dotted arrow A11.

A dotted arrow A12 illustrated in FIG. 5 indicates a cut-off wavelength of the optical combiner 12 and the optical splitter 13. With respect to an input port of the carrier light $E_{O2}$, for example, the optical combiner and the optical splitter 13 pass light having a wavelength greater than the cut-off wavelength indicated in the dotted arrow A12 and cut-off (split) light having a wavelength equal to or smaller than the cut-off wavelength indicated in the dotted arrow A12.

As illustrated in FIG. 5, the cut-off wavelength of the optical combiner 3 and the optical splitter 4 indicated in the dotted arrow A11 is supposed to greater than that of the optical combiner 12 and the optical splitter 13 indicated in the dotted arrow A12. In other words, wavelengths between the dotted arrows A11 and A12 illustrated in FIG. 5 are set so as to be varied in a transmission band of light propagating through the optical transmission line.

The wavelength $\lambda_{O1}$ of the carrier light $E_{O1}$ and the wavelength $\lambda_{O2}$ of the carrier light $E_{O2}$ are set to be varied in a transmission band between the dotted arrows A11 and A12. The wavelength $\lambda_{S1}$ of the signal light $E_{S1}$ and the wavelength $\lambda_{S2}$ of the signal light $E_{S2}$ are further set so as to be outside the transmission band. The wavelength $\lambda_{P1}$ of the output control light $E_{P1}$ and the wavelength $\lambda_{P2}$ of the output control light $E_{P2}$ are further set so as to be outside the transmission band.

The wavelength $\lambda_{OC1}$ of the idler light $E_{OC1}$ and the wavelength $\lambda_{OC2}$ of the idler light $E_{OC2}$ are further set so as to be outside the transmission band.

Specifically, the cut-off wavelength of the optical combiners 3 and 12 and that of the optical splitters 4 and 13 illustrated in FIG. 4 are set as indicated in the dotted arrows A11 and A12, and further the wavelengths $\lambda_{O1}$ and $\lambda_{O2}$ of the carrier light $E_{O1}$ and $E_{O2}$ are arranged as illustrated in FIG. 5. As a result, the carrier light $E_{O1}$ and $E_{O2}$ undergoes cross phase modulation with the signal light $E_{S1}$ and $E_{S2}$ without almost suffering loss. The signal light $E_{S1}$ and $E_{S2}$ having the wavelengths $\lambda_{S1}$ and $\lambda_{S2}$, the output control light $E_{P1}$ and $E_{P2}$ having the wavelengths $\lambda_{P1}$ and $\lambda_{P2}$, and the idler light $E_{OC1}$ and $E_{OC2}$ having the wavelengths $\lambda_{OC1}$ and $\lambda_{OC2}$ are arranged as illustrated in FIG. 5, and as a result, set so as not to propagate through the optical transmission line of the optical network.

Operations of FIG. 4 will be described. The case where the data signal is multiplexed on the carrier light $E_{O1}$ from the A direction to the B direction will be first described. The optical SW 2 supplies the signal light $E_{S1}$ to the optical combiner 3, for example, according to a monitor request from the optical signal processing apparatus (not illustrated) on the downstream side. The signal light $E_{S1}$ supplied to the optical combiner 3 is optically combined with the carrier light $E_{O1}$, and both lights are supplied to the nonlinear optical medium 1. In the nonlinear optical medium 1, the carrier light $E_{O1}$ undergoes cross phase modulation with the signal light $E_{S1}$, and the data signal of the signal light $E_{S1}$ is frequency-division multiplexed. Accordingly, the optical signal processing apparatus of FIG. 4 makes it possible to transmit the data signal in a place of its own apparatus to the downstream side.

In the case where the data signal is multiplexed on the carrier light $E_{O2}$ propagating from the B direction to the A direction, the optical SW 11 supplies the signal light $E_{S2}$ to the optical combiner 12, for example, according to a monitor request from the optical signal processing apparatus (not illustrated) on the upstream side. The signal light $E_{S2}$ supplied to the optical combiner 12 is optically combined with the carrier light $E_{O2}$, and both lights are supplied to the nonlinear optical medium 1. In the nonlinear optical medium 1, the carrier light $E_{O2}$ undergoes cross phase modulation with the signal light $E_{S2}$, and the data signal of the signal light $E_{S2}$ is frequency-division multiplexed. Accordingly, the optical signal processing apparatus of FIG. 4 makes it possible to transmit the data signal in a place of its own apparatus to the upstream side.

Next, the case where the data signal multiplexed on the carrier light $E_{O1}$ is acquired by the optical signal processing apparatus of FIG. 4 will be described. In other words, the case where monitor data is acquired on the upstream side of the optical signal processing apparatus of FIG. 4 will be described.

In this case, the optical SW 2 supplies to the optical combiner 3 the output control light $E_{P1}$ having the wavelength $\lambda_{P1}$ different from the wavelength $\lambda_{O1}$ of the carrier light $E_{O1}$. The output control light $E_{P1}$ supplied to the optical combiner 3 is optically combined with the carrier light $E_{O1}$, and both lights are supplied to the nonlinear optical medium 1. In the nonlinear optical medium 1, the idler light $E_{OC1}$ is generated by FWM using the output control light $E_{P1}$ as pump light.

The optical splitter 4 splits the idler light $E_{OC1}$ from the carrier light $E_{O1}$. It may safely be said that the idler light $E_{OC1}$ is a copy of the carrier light $E_{O1}$. Accordingly, the optical signal processing apparatus does not split the carrier light $E_{O1}$ but split the idler light $E_{OC1}$ from the optical transmission line, and acquires the upstream data signal from the split idler light $E_{OC1}$. Specifically, the optical signal processing apparatus acquires the upstream data signal so as not to exert an influence such as power loss on the carrier light $E_{O1}$ propagating through the optical transmission line.

In the case where the downstream data signal of the optical signal processing apparatus of FIG. 4 is acquired from the carrier light $E_{O2}$ propagating from the B direction to the A direction, the optical SW 11 supplies to the optical combiner 12 the output control light $E_{P2}$ having the wavelength $\lambda_{P2}$ different from the wavelength $\lambda_{O2}$ of the carrier light $E_{O2}$. The output control light $E_{P2}$ supplied to the optical combiner 12 is optically combined with the carrier light $E_{O2}$, and the carrier light $E_{O2}$ is supplied to the nonlinear optical medium 1. In the nonlinear optical medium 1, the idler light $E_{OC2}$ using as pump light the output control light $E_{P2}$ is generated.

The optical splitter 13 splits the idler light $E_{OC2}$ from the carrier light $E_{O2}$. Because the idler light. $E_{OC2}$ is a copy of the carrier light $E_{O2}$, it contains the same information of the carrier light $E_{O2}$. Accordingly, the optical signal processing apparatus does not split the carrier light $E_{O2}$ but split the idler light $E_{OC2}$ from the optical transmission line, and acquires the downstream data signal from the split idler light $E_{OC2}$. Specifically, the optical signal processing apparatus makes it possible to acquire the downstream data signal so as not to exert an influence such as power loss on the carrier light $E_{O2}$ propagating through the optical transmission line.

As can be seen from the above discussion, in order to acquire the data signal multiplexed on the carrier light $E_{O1}$ and $E_{O2}$ from the idler light $E_{OC1}$ and $E_{OC2}$ of the carrier light $E_{O1}$ and $E_{O2}$ propagating through the nonlinear optical medium 1 in two directions, the optical signal processing apparatus optically combines the output control light $E_{P1}$ and $E_{P2}$ for generating the idler light $E_{OC1}$ and $E_{OC2}$ with the carrier light $E_{O1}$ and $E_{O2}$. These features of the present embodiment permit the optical signal processing apparatus to suppress an influence exerted on the carrier light $E_{O1}$ and $E_{O2}$ and acquire the data signal multiplexed on the carrier light $E_{O1}$ and $E_{O2}$.

Third Embodiment

Next, a third embodiment will be described in detail with reference to the accompanying drawings. In the third embodiment, an optical communication system in which a plurality of optical signal processing apparatuses are inserted into an optical transmission line of an optical network will be described.

Figure 6:
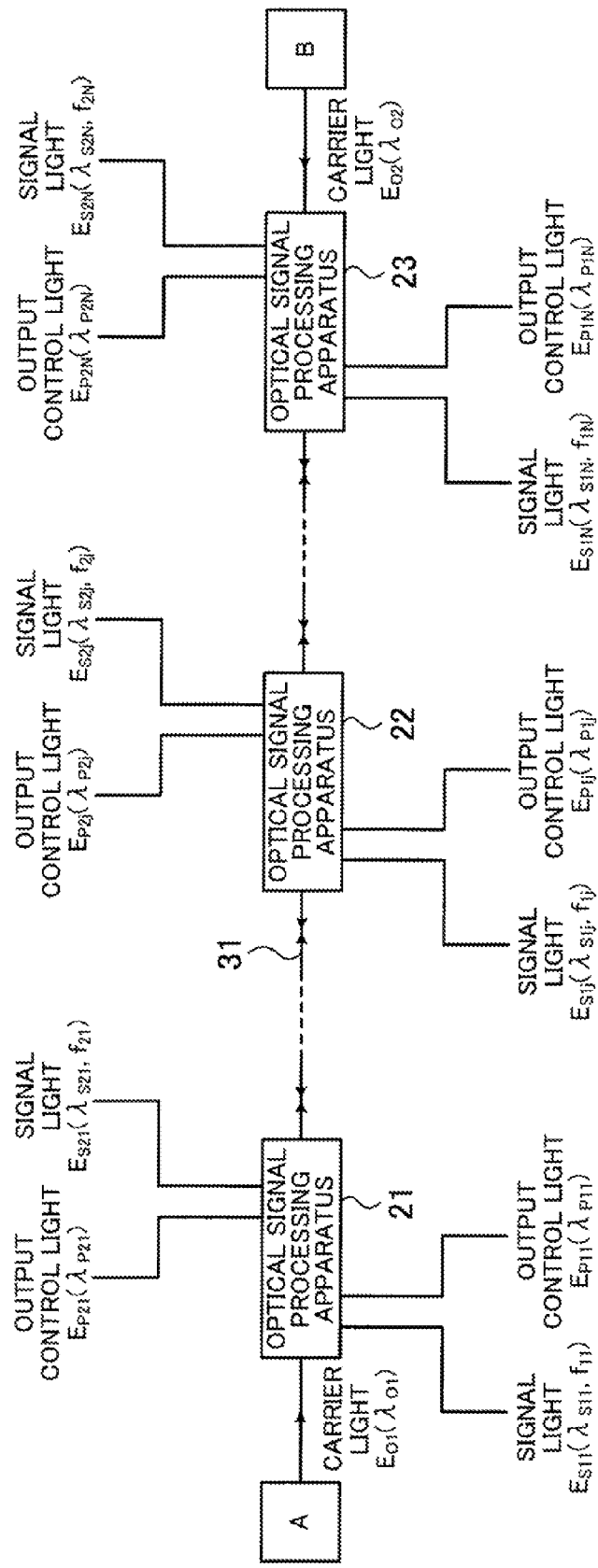
FIG. 6 illustrates an optical communication system according to a third embodiment.

FIG. 6 illustrates the optical communication system according to the third embodiment. As illustrated in FIG. 6, the optical communication system includes the optical signal processing apparatuses 21 to 23 and an optical transmission line 31. The optical signal processing apparatuses 21 to 23 are inserted into the optical transmission line 31, and terminals A and B are connected to both ends of the optical transmission line 31. The carrier light $E_{O1}$ having the wavelength $\lambda_{O1}$ propagates from the terminal A to the terminal B, and the carrier light $E_{O2}$ having the wavelength $\lambda_{O2}$ propagates from the terminal B to the terminal A.

In FIG. 6, only three optical signal processing apparatuses 21 to 23 are illustrated, and further N optical signal processing apparatuses are supposed to be arranged. Hereinafter, the optical signal processing apparatuses 21 to 23 may be called first, ..., j-th, ..., N-th optical signal processing apparatuses, respectively. Suppose further that the terminal A side is the upstream side and the terminal B side is the downstream side.

Each of the optical signal processing apparatuses 21 to 23 illustrated in FIG. 6 is equivalent to the optical signal processing apparatus illustrated in FIG. 4. Specifically, in the same manner as in the optical signal processing apparatus illustrated in FIG. 4, each of the optical signal processing apparatuses 21 to 23 includes one nonlinear optical medium, two optical SWs, two optical combiners, and two optical splitters. Examples of the nonlinear optical medium may include a part of an optical fiber forming the optical transmission line 31.

Hereinafter, the j-th optical signal processing apparatus 22 will be described. The first and N-th optical signal processing apparatuses 21 and 23 are the same as in the case where the j-th optical signal processing apparatus 22 is set as j=1 and j=N.

To the j-th optical signal processing apparatus 22, signal light $E_{S1j}$ and $E_{S2j}$ having wavelengths $\lambda_{S1j}$ and output control light $E_{P1j}$ and $E_{P2j}$ having wavelengths $\lambda_{P1j}$ and $\lambda_{P2j}$ are supplied. The signal light $E_{S1j}$ will be described later, and is optically modulated by a subcarrier modulated signal in which a subcarrier signal having a frequency $f_{1j}$ is modulated by a data signal. Further, the signal light $E_{S2j}$ will be described later, and is optically modulated by a subcarrier modulated signal in which a subcarrier signal having a frequency $f_{2j}$ is modulated by a data signal.

The signal light $E_{S1j}$ and the output control light $E_{P1j}$ are optically combined with the carrier light $E_{O1}$ by the optical combiner of the optical signal processing apparatus 22. Accordingly, the j-th optical signal processing apparatus 22 makes it possible to transmit the data signal in a place of its own apparatus to the downstream side, for example, according to a request from the optical signal processing apparatus on the downstream side. Further, the j-th optical signal processing apparatus 22 makes it possible to acquire the data signal from the optical signal processing apparatus on the upstream side.

The signal light $E_{O2j}$ and the output control light $E_{P2j}$ are optically combined with the carrier light $E_{O2}$ by the optical combiner of the optical signal processing apparatus 22. Accordingly, the j-th optical signal processing apparatus 22 makes it possible to transmit the data signal in a place of its own apparatus to the upstream side, for example, according to a request from the optical signal processing apparatus on the upstream side. Further, the j-th optical signal processing apparatus 22 makes it possible to acquire the data signal from the optical signal processing apparatus on the downstream side.

Frequencies $f_{11}, \ldots, f_{1j}, \ldots, f_{1N}, f_{21}, \ldots, f_{2j}, \ldots, f_{2N}$ of subcarrier signals in each of the N optical signal processing apparatuses are allocated so as to be different from each other. Through the process, the N optical signal processing apparatuses provided on the optical network frequency-division multiplex the data signals on the carrier light $E_{O1}$ and $E_{O2}$. As illustrated in FIG. 2B, for example, the data signals are frequency-division multiplexed on the carrier light $E_{O1}$ and $E_{O2}$. Note that the carrier light $E_{O1}$ and $E_{O2}$ is signal-detected at the terminals A and B.

As described above, in the optical signal processing apparatuses 21 to 23 inserted into the optical transmission line 31, in order to acquire the data signals multiplexed on the carrier light $E_{O1}$ and $E_{O2}$ from the idler light $E_{OC1}$ and $E_{OC2}$ of the carrier light $E_{O1}$ and $E_{O2}$ propagating through the nonlinear optical medium in two directions, the optical communication system optically combines the output control light $E_{P1}$ and $E_{P2}$ for generating the idler light $E_{OC1}$ and $E_{OC2}$ with the carrier light $E_{O1}$ and $E_{O2}$. As a result, the optical communication system suppresses an influence exerted on the carrier light $E_{O1}$ and $E_{O2}$, and acquires the data signals multiplexed on the carrier light $E_{O1}$ and $E_{O2}$.

Figure 7:
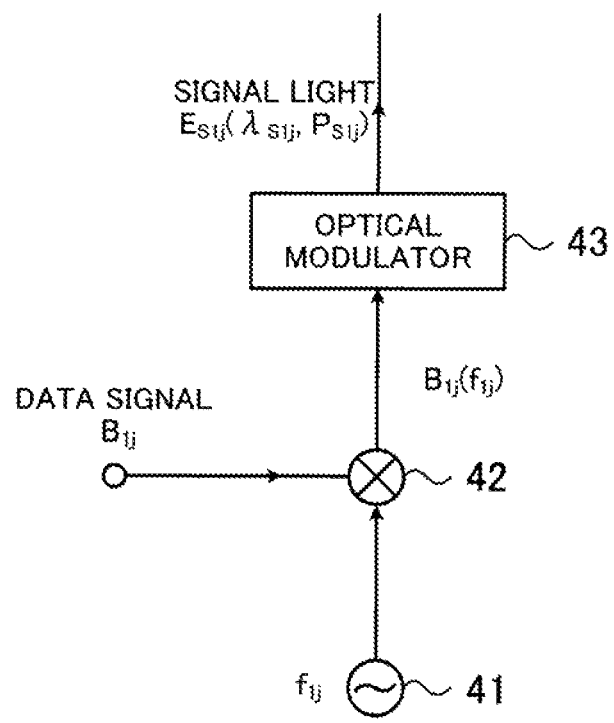
FIG. 7 illustrates an example of a signal light generation device which generates signal light.

FIG. 7 illustrates an example of a signal light generation device which generates signal light. In FIG. 7, the signal light generation device which generates the signal light $E_{S1j}$ supplied to the j-th optical signal processing apparatus 22 is illustrated. As illustrated in FIG. 7, the signal light generation device includes an oscillator 41, a multiplier 42, and an optical modulator 43.

The oscillator 41 supplies, for example, a subcarrier signal having a frequency $f_{1j}$ of RF (Radio Frequency) to the multiplier 42.

To the multiplier 42, a data signal $B_{1j}$ transmitted by the carrier light $E_{O1}$ (multiplexed on the carrier light $E_{O1}$) and a subcarrier signal produced from the oscillator 41 are supplied. The multiplier 42 modulates the subcarrier signal by the data signal $B_{1j}$, and supplies the subcarrier modulated signal $B_{1j}(f_{1j})$ to the optical modulator 43.

The optical modulator 43 outputs the signal light $E_{S1j}$ with power $P_{S1j}$ according to the subcarrier modulated signal $B_{1j}(f_{1j})$ produced from the multiplier 42.

The signal light $E_{S1j}$ having the wavelength $\lambda_{S1j}$ produced from the optical modulator 43 is supplied to an optical SW of the j-th optical signal processing apparatus 22 illustrated in FIG. 6. The signal light $E_{S1j}$ is supplied to an optical combiner by switching control of the optical SW of the j-th optical signal processing apparatus 22, and optically combined with the carrier light $E_{O1}$. As a result, the carrier light $E_{O1}$ undergoes cross phase modulation proportional to power of the signal light $E_{S1j}$ in the nonlinear optical medium of the j-th optical signal processing apparatus 22, so that the data signal is frequency-division multiplexed.

As described above, the signal light generation device outputs the signal light $E_{S1j}$ modulated by the subcarrier modulated signal $B_{1j}(f_{1j})$ modulated by the data signal $B_{1j}$. Accordingly, the signal light generation device makes it possible to frequency-division multiplex the data signal $B_{1j}$ on the carrier light $E_{O1}$ propagating through the optical network and transmit the data signal $B_{1j}$ from an arbitrary place in the optical network.

The signal light generation device may be included in the optical signal processing apparatus 22. Also, the signal light $E_{S2j}$ is generated by the same signal light generation device as in FIG. 7. The signal light supplied to the other optical signal processing apparatuses is also generated by the same signal light generation device as in FIG. 7. The signal light $E_S$ illustrated in FIG. 1 and the signal light $E_{S1}$ and $E_{S2}$ illustrated in FIG. 4 are also further generated by the same signal light generation device as in FIG. 7.

To the data signal $B_{1j}$, signals such as an amplitude modulated signal, phase modulated signal, frequency modulated signal, multi-value modulated signal, and orthogonal frequency division multiplexed signal, quadrature amplitude modulated signal are also applied.

A polarization state of the signal light $E_{S1j}$ and that of the carrier light $E_{O1}$ may be adjusted so as to acquire desired cross phase modulation, and the signal light $E_{S1j}$ and the carrier light $E_{O1}$ may be supplied to the optical combiner. For example, the polarization state of the signal light $E_{S1j}$ is matched with that of the carrier light $E_{O1}$ by using a polarization controller. Alternatively, a polarization diversity technique of performing optical phase modulation having almost the same modulation depth may be used in each pair of orthogonal polarizations.

As compared with the case where the polarization state of the signal light $E_{S1j}$ and that of the carrier light $E_{O1}$ are matched with each other, the modulation depth of the cross phase modulation in the case where they are perpendicular to each other is reduced. In this case, in a receiver, for example, after the carrier light $E_{O1}$ is converted into an electric signal to be demodulated into the data signal $B_{1j}$, a difference between the modulation depths is also compensated by using a compensating circuit or digital signal processing circuit.

Figure 8:
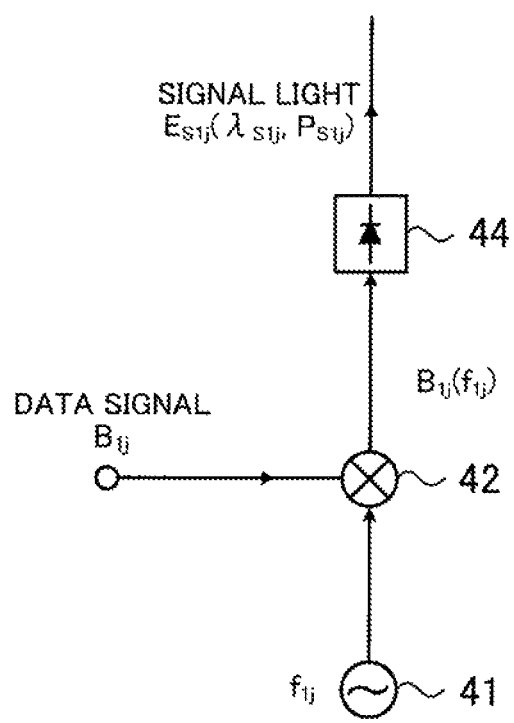
FIG. 8 illustrates another example of a signal light generation device.

FIG. 8 illustrates another example of a signal light generation device. In FIG. 8, the same circuit elements as those of FIG. 7 are indicated by the same reference numerals as in FIG. 7, and the description will not be repeated.

The signal light generation device of FIG. 8 has an LD (Laser Diode) 44. The subcarrier modulated signal $B_{1j}(f_{1j})$ produced from the multiplier 42 is supplied to the LD 44 as a driving current of the LD 44. Through the process, the optically modulated signal light $E_{S1j}$ is produced from the LD 44.

As described above, the signal light generation device outputs the signal light $E_{S1j}$ through the LD 44. As a result, the carrier light $E_{O1}$ undergoes cross phase modulation with the signal light $E_{S1j}$ in the nonlinear optical medium of the j-th optical signal processing apparatus 22. The signal light generation device enables transmission of the data signal $B_{1j}$ from an arbitrary place in the optical network.

Figure 9:
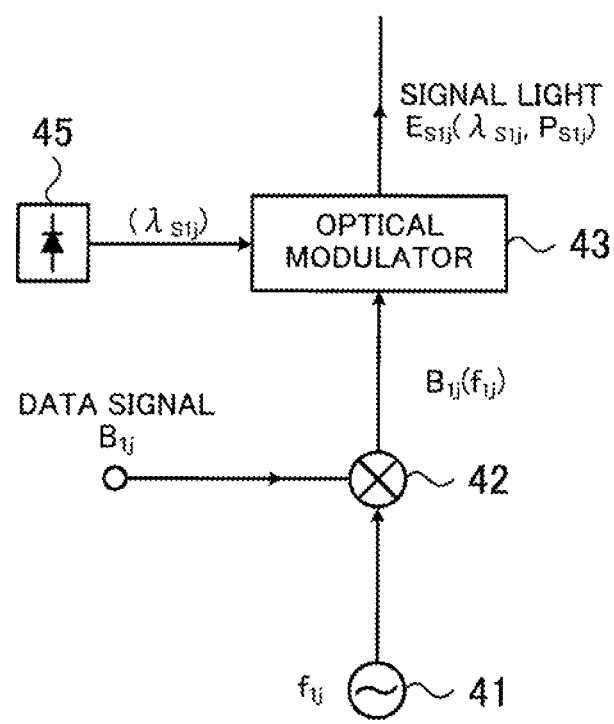
FIG. 9 illustrates another example of a signal light generation device.

FIG. 9 illustrates another example of a signal light generation device. In FIG. 9, the same circuit elements as those of FIG. 7 are indicated by the same reference numerals as in FIG. 7, and the description will not be repeated. In FIG. 8, the case where the LD 44 is driven by the subcarrier modulated signal $B_{1j}(f_{1j})$ for direct optical modulation is illustrated. In FIG. 9, the case where modulation is performed by using a light source and an external optical modulator will be described.

The signal light generation device has the LD 45 which outputs light having the wavelength $\lambda_{S1j}$. The light from the LD 45 is supplied to the optical modulator 43.

Examples of the optical modulator 43 may include a Mach-Zehnder modulator and an LN (lithium niobate) modulator. The optical modulator 43 modulates light produced from the LD 45 based on the subcarrier modulated signal $B_{1j}(f_{1j})$ produced from the multiplier 42, and outputs the signal light $E_{S1j}$ having the wavelength $\lambda_{S1j}$.

As can be seen from the above discussion, the signal light generation device also outputs the signal light $E_{S1j}$ by the optical modulation using the light source and the external optical modulator. In the case where the bandwidth of the external optical modulator is wide, it is possible to expect that the signal light generation device outputs the signal light $E_{S1j}$ in response to the subcarrier modulated signal $B_{1j}(f_{1j})$ having higher frequencies than the signal light generation device of FIG. 8, in which the LD 44 is directly modulated. However, the signal light generation device in the direct optical modulation of FIG. 8 is constructed with a smaller number of components than that in the external optical modulation of FIG. 9. Therefore, the signal light generation device in the direct optical modulation of FIG. 8 is constructed at lower cost than that in the external optical modulation of FIG. 9.

In addition, as another example of a signal light generation device, beat light which is obtained as a difference frequency component when two light waves having different wavelengths (frequencies) are optically combined may be used as the signal light $E_{S1j}$.

Figure 10:
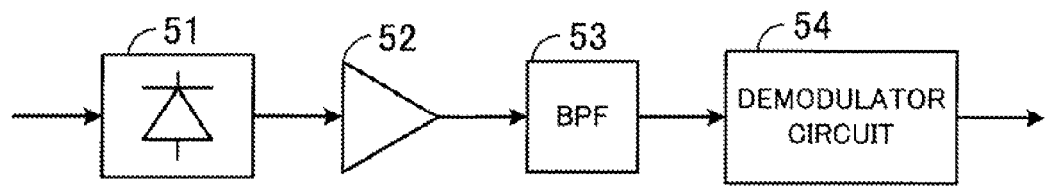
FIG. 10 illustrates an example of a receiver.

FIG. 10 illustrates an example of the receiver. The N optical signal processing apparatuses illustrated in FIG. 6 each have, for example, the receiver illustrated in FIG. 10. To the receiver, for example, idler light split by the optical splitter of the optical signal processing apparatus is supplied. As illustrated in FIG. 10, the receiver has a PD 51, an amplifier 52, a BPF (Band Pass Filter) 53, and a demodulator circuit 54.

To the PD 51, idler light split by the optical splitter is supplied. The PD 51 is an optical receiver which converts the idler light into an electric signal. From the PD 51, for example, n-channel subcarrier-modulated electric signals are supplied to the amplifier 52.

The amplifier 52 amplifies the electric signal produced from the PD 51. The BPF 53 passes the electric signal produced from the amplifier 52 at the center of frequencies of the subcarrier signal. For example, in the case where the amplifier 52 produces an electric signal including n-channel subcarrier-modulated signals, the BPF passes electric signals in the ranges respectively centered at the frequencies of the n corresponding subcarrier signals. That is, the BPF 53 separates the electric signal produced from the amplifier 52 in each channel. Alternatively, the BPF 53 may pass the subcarrier signal corresponding to necessary channels, instead of passing the electric signal corresponding to all the n channels.

The demodulator circuit 54 is a circuit which demodulates the data signals, for example, according to the manner of modulation of the data signals. Examples of the demodulator circuit 54 include an envelope detector, a square-law detector, a phase detector, and a frequency detector.

As described above, the receiver demodulates the data signal from the idler light split by the optical splitter.

In addition, the receiver of FIG. 10 is also provided on the terminals A and B. Specifically, the terminals A and B perform signal detection of the carrier light $E_{O1}$ and $E_{O2}$ by using the receiver of FIG. 10.

The receiver of FIG. 10 is applicable also to the optical signal processing apparatuses of FIGS. 1 and 4. For example, when the idler light $E_{OC}$ of FIG. 1 is supplied to the PD 51, the receiver demodulates the data signal multiplexed on the carrier light $E_O$. Further, when the idler light $E_{OC1}$ and $E_{OC2}$ of FIG. 4 is supplied to the PD 51, the receiver demodulates the data signal multiplexed on the carrier light $E_{O1}$ and $E_{O2}$.

Further alternatively, it is possible to arrange, in the subsequent stage of the demodulator circuit 54, a digital signal processing circuit which compensates for an influence of detection of errors and fluctuations in the demodulated data signals.

Figure 11:
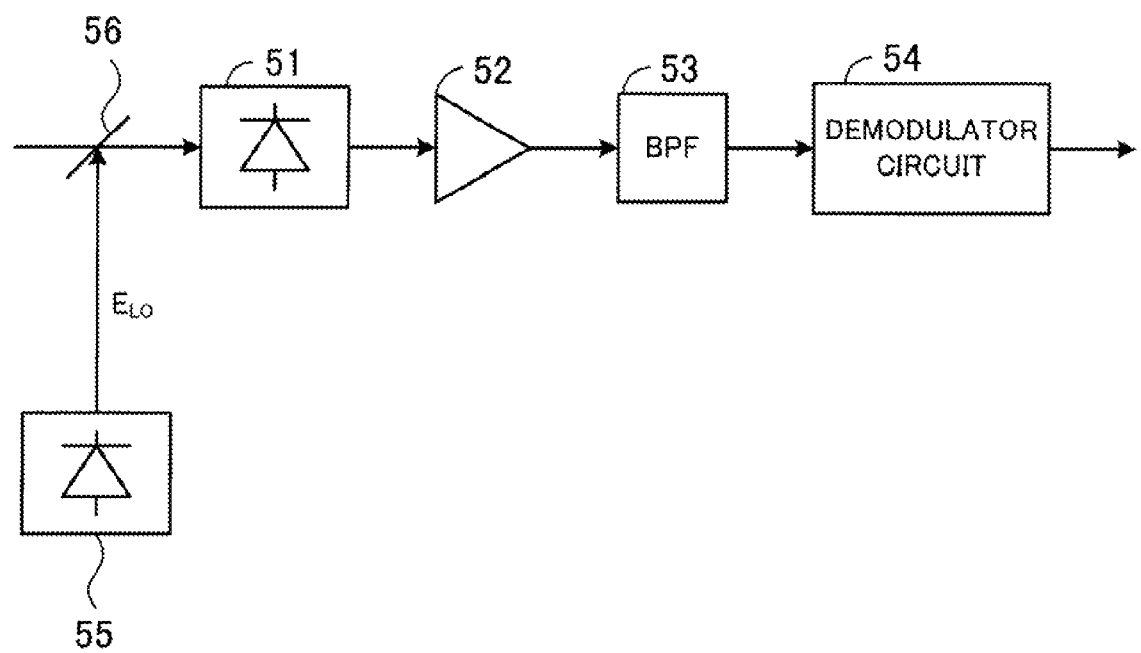
FIG. 11 illustrates another example of a receiver.

FIG. 11 illustrates another example of a receiver. In FIG. 11, the same circuit elements as those of FIG. 10 are indicated by the same reference numerals as in FIG. 10, and the description will not be repeated.

The receiver of FIG. 11 has an LD 55 and an optical combiner 56. The LD 55 supplies local light $E_{LO}$ to the optical combiner 56. The optical combiner 56 optically combines the local light $E_{LO}$ with the idler light to be supplied to the PD 51.

The frequency of the local light $E_{LO}$ is differentiated from the frequency of the idler light by a desired detuning frequency ($f_{if}$). Through the above process, an electric signal in an intermediate frequency band ($f_{if}$) is acquired from the PD 51. Further alternatively, after receiving the idler light, the receiver demodulates an electric signal by using a digital signal processing device. To effectively use the receiver bandwidth $f_{if}$ may set to be zero and apply the homodyne detection followed by the digital signal processing.

As can be seen from the above discussion, these features of the third embodiment permit the receiver using the local light $E_{LO}$ to demodulate a data signal from idler light split by an optical splitter.

Fourth Embodiment

Next, a fourth embodiment will be described in detail with reference to the accompanying drawings. In the fourth embodiment, control of the optical SW will be described.

Figure 12:
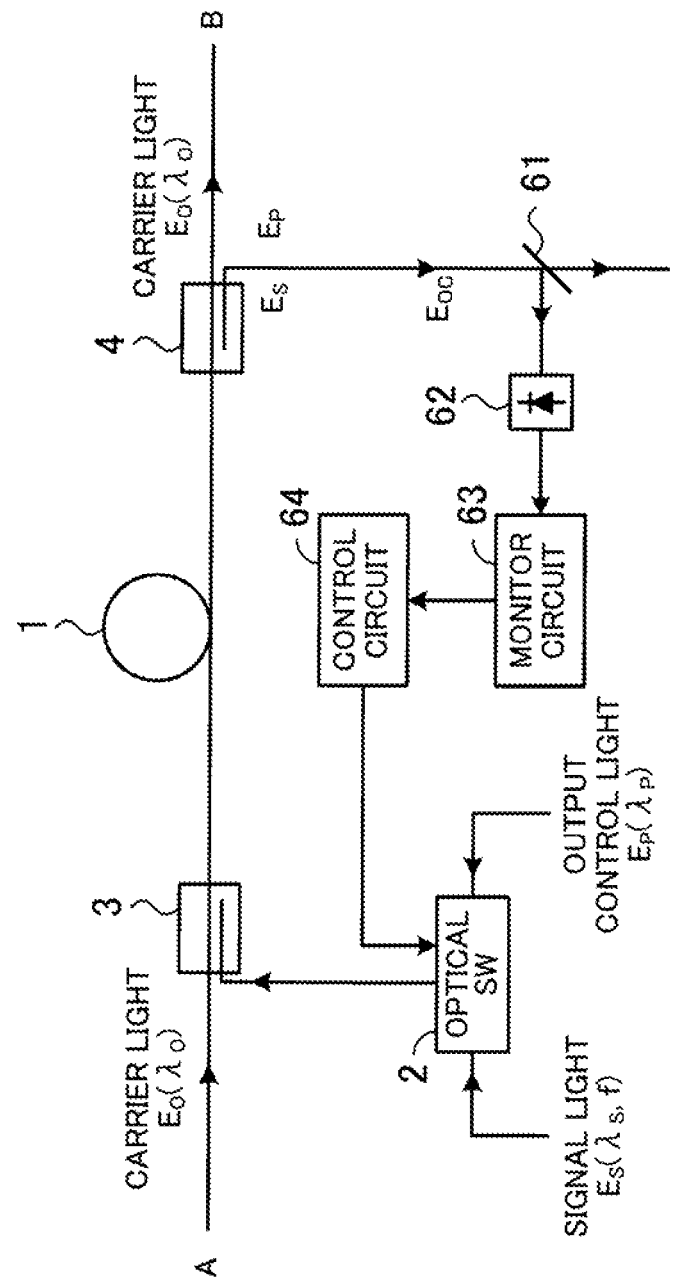
FIG. 12 illustrates an optical signal processing apparatus according to a fourth embodiment.

FIG. 12 illustrates an optical signal processing apparatus according to the fourth embodiment. In FIG. 12, the same circuit elements as those of FIG. 1 are indicated by the same reference numerals as in FIG. 1, and the description will not be repeated. As illustrated in FIG. 12, the optical signal processing apparatus includes a coupler 61, a PD 62, a monitor circuit 63, and a control circuit 64.

To the coupler 61, the idler light $E_{OC}$ split by the optical splitter 4 is supplied. The coupler 61 branches the idler light $E_{OC}$, and supplies it to the PD 62 and the receiver (not illustrated). Examples of the receiver (not illustrated) include the receivers illustrated in FIGS. 10 and 11.

The PD 62 is an optical receiver which converts the idler light $E_{OC}$ into an electric signal. From the PD 62, for example, n-channel subcarrier-modulated electric signals are supplied to the monitor circuit 63.

The monitor circuit 63 demodulates a predetermined electric signal among the n-channel subcarrier-modulated electric signals. For example, the monitor circuit 63 demodulates a control signal representing a transmission request of the data signal. To the monitor circuit 63, for example, the receivers illustrated in FIGS. 10 and 11 may be applied.

Based on the control signal produced from the monitor circuit 63, the control circuit 64 supplies a switching signal for switching an output from the optical SW 2. For example, in the case where the control signal representing a transmission request of the data signal is produced from the monitor circuit 63, the control circuit 64 supplies the switching signal for producing the signal light $E_S$ from the optical SW 2.

As described above, the optical signal processing apparatus multiplexes a control signal for switching an output from the optical SW 2 on the carrier light $E_O$ for transmission, thereby switching the output from the optical SW 2.

In the above, the optical signal processing apparatus multiplexes the control signal for switching the optical SW 2 on the carrier light $E_O$ for transmission. Further, for example, the optical signal processing apparatus supplies a wireless communicated control signal to the control circuit 64 and performs switching control of the optical SW 2. Suppose, for example, that the optical signal processing apparatus on the downstream side desires to monitor a state of the optical network in a place of the optical signal processing apparatus illustrated in FIG. 12. In this case, the optical signal processing apparatus on the downstream side transmits the control signal to the control circuit 64 through wireless communication. Based on the received control signal, the control circuit 64 supplies a switching signal to the optical SW 2 so that the optical SW 2 may supply the signal light $E_S$ to the optical combiner 3.

The coupler 61, PD 62, monitor circuit 63, and control circuit 64 of FIG. 12 are applicable also to the optical signal processing apparatus of FIG. 4 and the optical communication system of FIG. 6 of two-way communication. In this case, for example, the optical signal processing apparatus on the downstream side multiplexes the control signal on the carrier light $E_{O2}$ and performs a transmission request for the data signal to the optical signal processing apparatus on the upstream side. According to the transmission request for the data signal from the optical signal processing apparatus on the downstream side, the optical signal processing apparatus on the upstream side multiplexes the data signal on the carrier light $E_{O1}$ and transmits the data signal to the optical signal processing apparatus on the downstream side. In the same manner, for example, the optical signal processing apparatus on the upstream side multiplexes the control signal on the carrier light $E_{O1}$ and performs a transmission request for the data signal to the optical signal processing apparatus on the downstream side. According to the transmission request for the data signal from the optical signal processing apparatus on the upstream side, the optical signal processing apparatus on the downstream side multiplexes the data signal on the carrier light $E_{O2}$ and transmits the data signal to the optical signal processing apparatus on the upstream side.

Hereinafter, the cross phase modulation in an optical fiber will be described.

A length of the optical fiber is set to L, and loss thereof is set to a. In this case, an optical phase modulation quantity $\phi(L)$ of the carrier light is approximated by the following expression (1).

$$\phi(L) = \gamma P_P(0)l(L) \quad (1)$$

$$l(L) = (1 - e^{-\alpha L})/\alpha L \quad (2)$$

Here, Pp(O) of the expression (1) represents light power of the signal light, and the expression (2) represents a nonlinear mutual operation length. Further, $\gamma$ of the expression (1) represents a third-order nonlinear coefficient, and is represented by the following expression (3).

$$\gamma = \frac{\omega n_2}{c A_{eff}} \quad (3)$$

Here, c represents a velocity of light, and $\omega$ represents an angular frequency of carrier light. Further, $n_2$ and $A_{eff}$ represent a nonlinear refractive index and effective core cross-sectional area of an optical fiber, respectively.

As can be seen from various embodiments discussed above, in the case where the carrier light is wavelength-division multiplexed, the optical signal processing apparatus collectively multiplexes signals on the carrier light. In the case where the carrier light remains to propagate through a nonlinear optical fiber, the optical signal processing apparatus multiplexes new data on the carrier light in real time. Accordingly, for example, when nonlinear optical fibers are arranged in respective places j and WDM couplers for optically combining and splitting signal light are arranged at input-output terminals, the optical signal processing apparatus multiplexes signals on the carrier light.

As the nonlinear optical fiber, it is possible to use a portion with an arbitrary length of the optical transmission line, for example, arrange WDM couplers on both sides of the portion, and multiplex a data signal on the carrier light. Namely, it is possible to multiplex a data signal on the carrier light by using a nonlinear optical effect in the optical transmission line. Therefore, the optical signal processing apparatus matches well with conventional systems.

In the case where a length of the nonlinear optical fiber is made short, the nonlinear optical fiber in which the nonlinear optical effect is improved may be used. Examples of the optical fiber include a highly-nonlinear fiber (HNLF) and an optical fiber in which the nonlinear refractive index is increased by doping a core with germanium or bismuth. An optical fiber in which the optical power density is increased by reducing the waveguide structures or the mode field is considered. Further, an optical fiber using chalcogenide glass or a photonic crystal fiber is considered.

As can be seen from various embodiments discussed above, the proposed optical signal processing apparatus and optical communication system suppress an influence exerted on carrier light and acquire signals multiplexed on the carrier light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. An optical signal processing apparatus-comprising:
    a nonlinear optical medium through which carrier light propagates;
    an optical combiner configured to optically combine control light, for generating idler light of the carrier light, with the carrier light;
    an optical splitter configured to split the idler light from the carrier light;
    a receiver configured to acquire a signal, multiplexed on the carrier light, from the idler light split by the optical splitter; and
    a switch configured to switch between the control light and signal light for multiplexing a signal on the carrier light through cross phase modulation in the nonlinear optical medium and supply one of the control light and the signal light to the optical combiner.

2. The optical signal processing apparatus according to claim 1, wherein the switch supplies the signal light to the optical combiner according to a request from another optical signal processing apparatus.

3. The optical signal processing apparatus according to claim 1, wherein a signal multiplexed on the carrier light is multiplexed on the carrier light by subcarrier-modulated signal light.

4. An optical communication system comprising:
    a plurality of optical signal processing apparatuses each including:
        a nonlinear optical medium through which first carrier light propagates in a first direction, and second carrier light propagates in a second direction opposite to the first direction,
        a first optical combiner disposed at one end of the nonlinear optical medium and configured to optically combine first control light with the first carrier light so as to generate first idler light of the first carrier light,
        a first optical splitter disposed at the other end of the nonlinear optical medium and configured to split the first idler light from the first carrier light,
        a first receiver configured to acquire a first signal, multiplexed on the first carrier light, from the first idler light split by the first optical splitter,
        a second optical combiner disposed at the other end of the nonlinear optical medium and configured to optically combine second control light with the second carrier light so as to generate second idler light of the second carrier light,
        a second optical splitter disposed at the one end of the nonlinear optical medium and configured to split the second idler light from the second carrier light, and
        a second receiver configured to acquire a second signal, multiplexed on the second carrier light, from the second idler light split by the second optical splitter,
        wherein the first optical combiner and first optical splitter have a first cut-off wavelength, while the second optical combiner and second optical splitter have a second cut-off wavelength different from the first cut-off wavelength; and an optical transmission line into which the plurality of optical signal processing apparatuses are inserted.

5. An optical signal processing apparatus comprising:

a nonlinear optical medium through which first carrier light propagates in a first direction, and second carrier light propagates in a second direction opposite to the first direction;

a first optical combiner disposed at one end of the nonlinear optical medium and configured to optically combine first control light with the first carrier light so as to generate first idler light of the first carrier light;

a first optical splitter disposed at the other end of the nonlinear optical medium and configured to split the first idler light from the first carrier light;

a first receiver configured to acquire a first signal, multiplexed on the first carrier light, from the first idler light split by the first optical splitter;

a second optical combiner disposed at the other end of the nonlinear optical medium and configured to optically combine second control light with the second carrier light so as to generate second idler light of the second carrier light;

a second optical splitter disposed at the one end of the nonlinear optical medium and configured to split the second idler light from the second carrier light; and a second receiver configured to acquire a second signal, multiplexed on the second carrier light, from the second idler light split by the second optical splitter;

wherein the first optical combiner and first optical splitter have a first cut-off wavelength, while the second optical combiner and second optical splitter have a second cut-off wavelength different from the first cut-off wavelength.

* * * * *